(12) United States Patent
Kraft et al.

(10) Patent No.: US 9,043,413 B2
(45) Date of Patent: May 26, 2015

(54) SYSTEM AND METHOD FOR EXTRACTING, COLLECTING, ENRICHING AND RANKING OF EMAIL OBJECTS

(75) Inventors: Reiner Kraft, Gilroy, CA (US); Farzin Maghoul, Hayward, CA (US)

(73) Assignee: Yahoo! Inc., Sunnyvale, CA (US)

( * ) Notice: Subject to any disclaimer, the term of this patent is extended or adjusted under 35 U.S.C. 154(b) by 766 days.

(21) Appl. No.: 13/296,341

(22) Filed: Nov. 15, 2011

(65) Prior Publication Data

US 2013/0124646 A1 May 16, 2013

(51) Int. Cl.
*G06F 15/16* (2006.01)
*G06F 17/30* (2006.01)
*G06Q 10/10* (2012.01)
*H04L 12/58* (2006.01)

(52) U.S. Cl.
CPC ........ *G06F 17/30684* (2013.01); *G06Q 10/107* (2013.01); *G06F 17/30731* (2013.01); *H04L 51/12* (2013.01)

(58) Field of Classification Search
CPC .......... H04L 51/12; H04L 51/14; H04L 51/26
USPC .................................................. 709/206–207
See application file for complete search history.

(56) References Cited

U.S. PATENT DOCUMENTS

| | | |
|---|---|---|
| 7,321,887 B2 * | 1/2008 | Dorner et al. .......................... 1/1 |
| 7,548,848 B1 * | 6/2009 | Deb et al. ........................... 704/9 |
| 8,392,409 B1 * | 3/2013 | Kashyap et al. ............... 707/723 |
| 2011/0055264 A1 * | 3/2011 | Sundelin et al. .............. 707/776 |
| 2012/0110032 A1 * | 5/2012 | Robison et al. ............... 707/812 |
| 2012/0124041 A1 * | 5/2012 | Bawri et al. .................. 707/728 |
| 2012/0209847 A1 * | 8/2012 | Rangan ......................... 707/737 |

* cited by examiner

*Primary Examiner* — Jason Recek
(74) *Attorney, Agent, or Firm* — Cooper Legal Group, LLC (57) ABSTRACT

Enriching emails includes: receiving a user's email messages; performing a semantic analysis on the email message body; deriving a plurality of objects of interest; associating search-based content with the objects of interest; ranking the objects of interest; and outputting the ranked objects with the search-based content into a current email message of the user.

20 Claims, 5 Drawing Sheets

| Object Category | Examples |
|---|---|
| Tracking data | email addresses, URLs, ISBN, phone numbers, UPS tracking numbers, order numbers |
| Locations | Street addresses, points of interest |
| Local Businesses | Restaurants, shops, and stores |
| Names | friends, celebrities |
| Products | iPad2 |
| Titles | movie titles, book titles |
| Content | politics, birthday party, business meeting |
| Concepts | trends, legal |

SYSTEM AND METHOD FOR EXTRACTING, COLLECTING, ENRICHING AND RANKING OF EMAIL OBJECTS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of electronic mail messaging, and more particularly relates to the field of organizing email messages.

BACKGROUND OF THE INVENTION

With the increasing amount of daily emails it becomes difficult to keep track of current important items of interest and stay up-to-date on recent relevant news or information. This is because objects are buried within the text in emails. Existing email solutions allow one to organize emails in folders, by tags, and make it searchable, support automation rules, and so forth. For example, Yahoo OpenMail framework goes a step further to allow applications to be integrated into email environment to add value to your email web application (e.g., sharing photos of email on Flickr). Once the objects are detected and identified, Yahoo! Mail offers actionable triggers (e.g., show a place on a map, show related information on Y! News). The Yahoo! Mail application falls short, however, because it does not aggregate your current items of interest into a meaningful digest and provide a way of conveniently processing and managing the digest.

SUMMARY OF THE INVENTION

Briefly, according to an embodiment of the invention a method for enriching emails includes steps or acts of: receiving a user's email messages; performing a semantic analysis on the email message body; deriving a plurality of objects of interest; associating search-based content with the objects of interest; ranking the objects of interest; and outputting the ranked objects with the search-based content into a current email message of the user.

According to another embodiment of the present invention, a system for enriching emails includes: a memory with program instructions for causing a computer to perform the above steps; and a processor device for executing the program instructions.

The method can also be implemented as machine executable instructions executed by a programmable information processing system or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION OF THE PREFERRED EMBODIMENTS

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a system and method that automatically a) determines the current relevant objects of interest from a user's communication stream; and b) organizes information conveniently around the relevant objects of interest from emails. We leverage applications such as Contextual Shortcuts in Yahoo! Mail that analyze emails and detect items of interest from the emails.

The system and method for ranking email objects according to an embodiment of the invention performs ongoing semantic analysis and object detection on all incoming emails of a user, aggregates objects, ranks, and applies filters based on various ranking dimensions by integrating a sliding window of time. The end result to the user is an organized, up-to-date listing of relevant objects offered in an easy to use and intuitive way to conveniently access the relevant objects, and use them as triggers for additional information and services. Additional information and services can be obtained for example from search engines, content providers, or other service providers, based on the given entity and context. A concrete example would be if we have a movie entity, we could show movie times, movie reviews, as well as allowing user to add that movie to a Netfix queue, or even purchase the tickets online.

A key benefit of the invention is that it incorporates a fresh "Object View" into a user's emails by:

sorting/filtering objects by various criteria to bring the most interesting and/or important objects to the surface;

automatically collecting metadata and associating the metadata to the sorted objects;

extracting the core or digest of emails and arranging it in an easy to browse view; and building applications to help users view, organize and/or share these objects conveniently.

Figure 1:
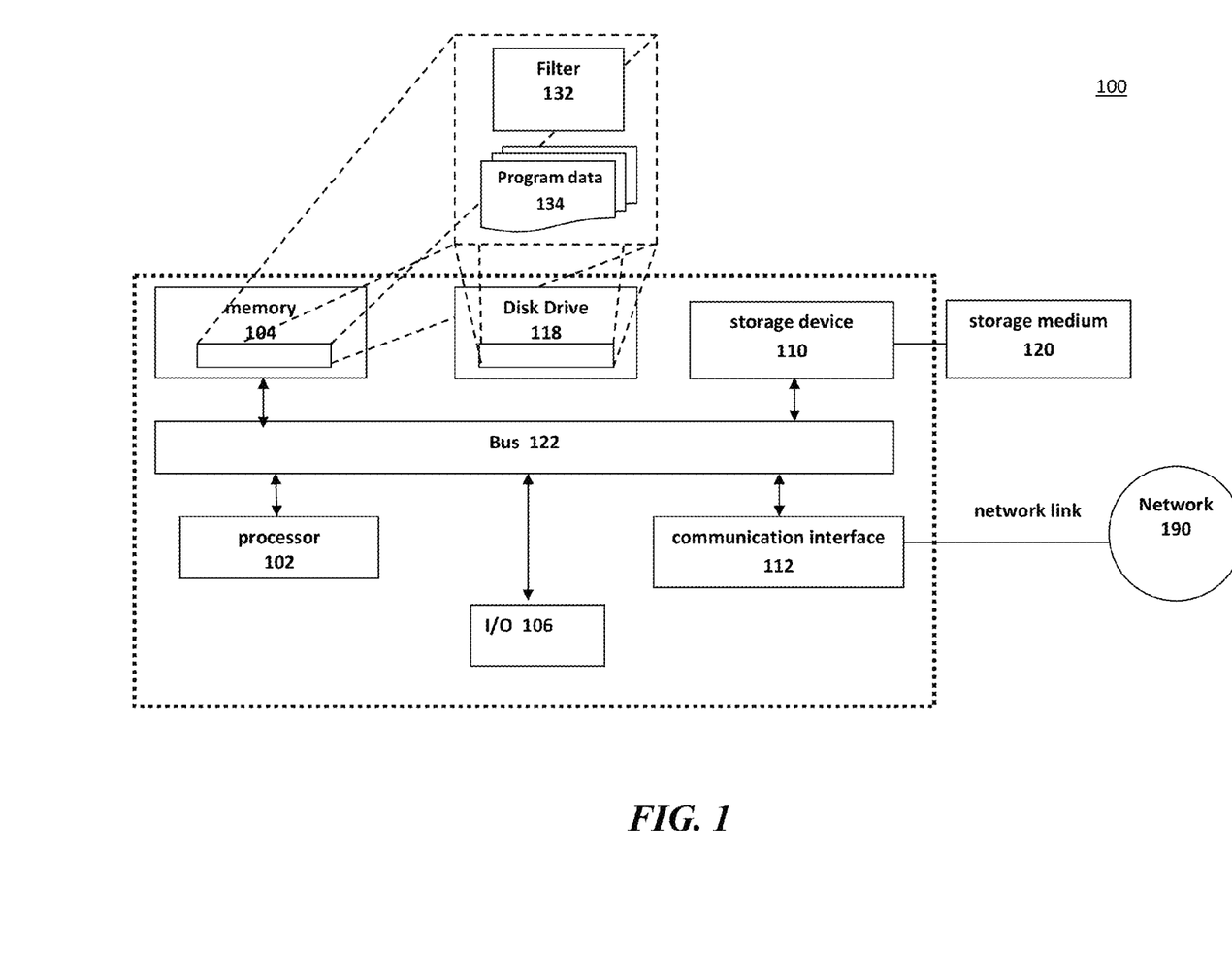
FIG. 1 is a high level block diagram showing an information processing system configured to operate according to an embodiment of the present invention.

FIG. 1 System Embodiment

Referring now in specific detail to the drawings, and particularly FIG. 1, there is provided a simplified pictorial illustration of an information processing system for ranking email objects in which the present invention may be implemented. For purposes of this invention, computer system 100 may represent any type of computer, information processing system or other programmable electronic device, including a client computer, a server computer, a portable computer, an embedded controller, a personal digital assistant, and so on. The computer system 100 may be a stand-alone device or networked into a larger system. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100.

Computer system 100 includes processing device 102 which communicates with an input/output subsystem 106, memory 104, storage 110 and network 110. The processor device 102 is operably coupled with a communication infrastructure 122 (e.g., a communications bus, cross-over bar, or network). The processor device 102 may be a general or special purpose microprocessor operating under control of computer program instructions executed from memory 104 on program data 134. The program data 134 includes the objects and their metadata. A filter 132 may also be stored in memory 104. The filter 132 includes instructions for ranking and determining relevance of the objects. The processor 102 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 104 may be partitioned or otherwise mapped to reflect the boundaries of the various memory subcomponents. Memory 104 may include both volatile and persistent memory for the storage of: operational instructions 132 for execution by CPU 102, data registers, application storage and the like. Memory 104 preferably includes a combination of random access memory (RAM), read only memory (ROM) and persistent memory such as that provided by a hard disk drive 118. The computer instructions/applications that are stored in memory 104 are executed by processor 102. The computer instructions/applications 132 and program data 134 can also be stored in hard disk drive 118 for execution by processor device 102. Memory 104.

The I/O subsystem 106 may comprise various end user interfaces such as a display, a keyboards, and a mouse. The I/O subsystem 106 may further comprise a connection to a network 190 such as a local-area network (LAN) or wide-area network (WAN) such as the Internet.

The computer system 100 may also include a removable storage drive 110, representing a floppy disk drive, a magnetic tape drive, an optical disk drive, etc. The removable storage drive 110 reads from and/or writes to a removable storage unit 120 in a manner well known to those having ordinary skill in the art. Removable storage unit 120, represents a floppy disk, a compact disc, magnetic tape, optical disk, CD-ROM, DVD-ROM, etc. which is read by and written to by removable storage drive 110. As will be appreciated, the removable storage unit 120 includes a non-transitory computer readable medium having stored therein computer software and/or data.

The computer system 100 may also include a communications interface 112. Communications interface 112 allows software and data to be transferred between the computer system and external devices. Examples of communications interface 112 may include a modem, a network interface (such as an Ethernet card), a communications port, a PCM-CIA slot and card, etc. Software and data transferred via communications interface 112 are in the form of signals which may be, for example, electronic, electromagnetic, optical, or other signals capable of being received by communications interface 112.

In this document, the terms "computer program medium," "computer usable medium," and "computer readable medium" are used to generally refer to both transitory and non-transitory media such as main memory 104, removable storage drive 120, a hard disk installed in hard disk drive 118, and signals. These computer program products are means for providing software to the computer system 100. The computer readable medium 120 allows the computer system 100 to read data, instructions, messages or message packets, and other computer readable information from the computer readable medium 120.

Figure 2:
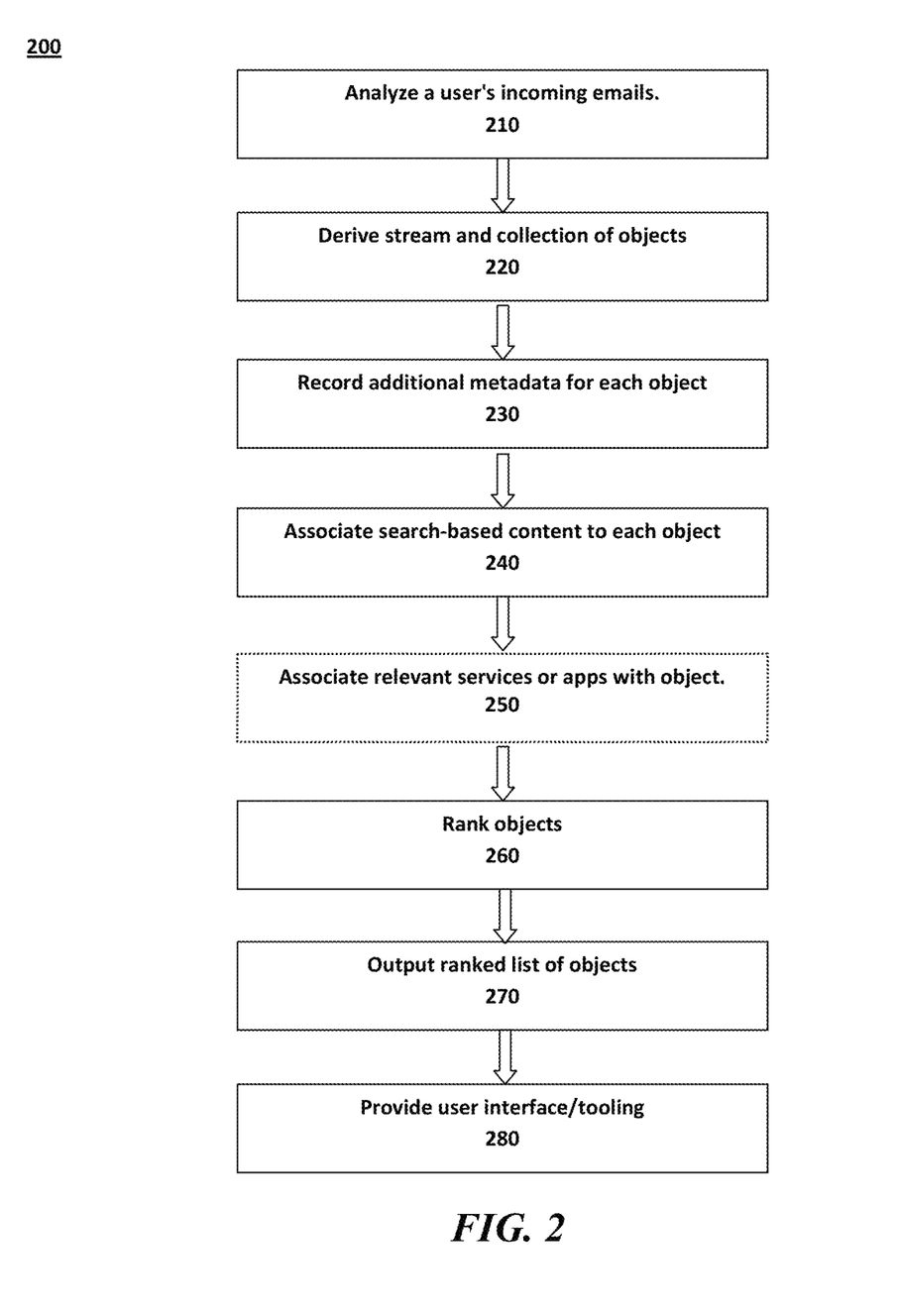
FIG. 2 is a flowchart of a method according to an embodiment of the present invention.

Referring now to FIG. 2, there is illustrated a flow chart 200 illustrating a method for automatically a) determining the current relevant objects of interest from a user's communication stream; and b) organizing information conveniently around the relevant objects of interest, according to an embodiment of the invention. The method begins at step 210 wherein we perform ongoing semantic analysis and object detection on all incoming emails. Simply put, we detect and identify a variety of "relevant" objects from a user's emails, after first filtering out the salutation and signature of the email. This can be done with an application on a client (e.g., Outlook) or on a server (e.g., Yahoo Mail). For semantic analysis we can use a service such as Contextual Analysis Platform (CAP), but such an analysis could be done also using different semantic analysis tools available to the public (e.g., OpenCalais). These objects can be: email content, URLs, ISBN, UPS tracking, places, entities, concepts, and the like. We select these objects because of an expectation that they offer an insight into the user's interests at this point in time.

As a result in step 220 we obtain a stream and collection of objects (e.g., entities, concepts, URLs, email addresses, locations, local restaurants, . . . ) derived from the user's email messages. Each object has a time-stamp associated with it providing the time when the object was created and when the email was created/received. For each object we also record additional metadata, such as the sender, priority of the email, and so forth in step 230.

In step 240 we also associate search based content to each object by applying search services such as Yahoo! search, real-time content (Twitter), or similar services to each object. For the purpose of this invention it is not important what type of dynamic content gets associated; but for a particular embodiment we use popular search sources (based on the object's type) that take as input a string representation of the object (e.g., for a place obtain a map, for a local business get a Yelp review etc.). Y! product like Contextual Shortcuts are an example of this type of related information by type of an object. Furthermore, in an optional step 250 we may also associate relevant services or applications with an object. For example, with a movie object we would associate a movie rental service such as Netflix, Inc. and/or a movie times listing.

In step 260 we rank the objects. We use a ranking component that organizes and sorts the importance of those objects based on parameters such as: a) time (e.g., sliding window of 1 day); b) type of the object (e.g., location, local business, person); c) history of interaction; d) buzzyness; e) overall popularity; and other parameters contemplated within the spirit and scope of the invention.

Buzzyness in this context refers to the temporal popularity of the object. We are able to calculate buzzyness through various approaches. For example, using (near real-time) query log mining, a particular entity that is exceeding a certain number of queries per day while compared with its regular query volume may be considered 'buzzing.' For example, the entity 'Tom Cruise' may receive an average of 10K queries per day. All of a sudden 'Tom Cruise" queries are spiking and query volume increases to 30K per day. Similarly, popularity can be calculated with a look at the average frequency of query logs. If 'car insurance' received 1K daily queries compared to 'Tom Cruise' then 'Tom Cruise' could be considered overall more popular with an average of 10K daily queries. There is existing research/work on determining popularity of queries that can be used/referenced as background. We are not limited to these ranking dimensions and may integrate or aggregate different ones, and also apply other standard personalization techniques to improve the overall relevancy of objects to the user's needs.

Next in step 270 for any given time we output a ranked list of objects (along with meta-data for each object) retrieved from user's current emails and make it available to an application that can display it in a user friendly way. The delivery of the ranking can be scheduled, so that that list of objects will be refreshed e.g., every 5 minutes.

Figure 4:
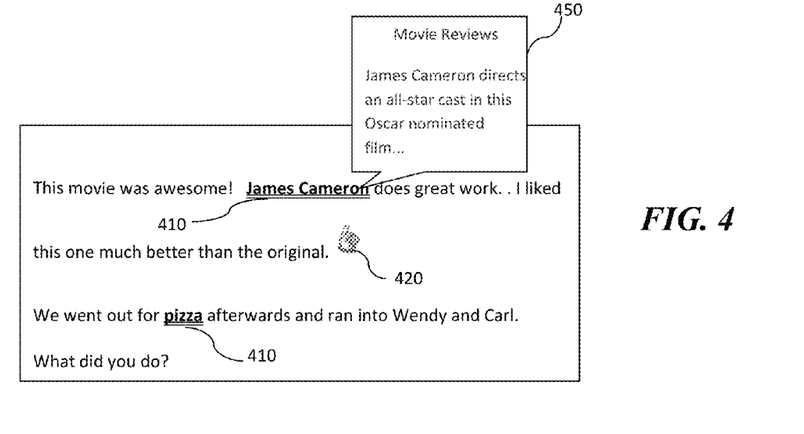
FIG. 4 is an example of a contextual shortcuts tool configured to operate according to an embodiment of the present invention.
Figure 5:
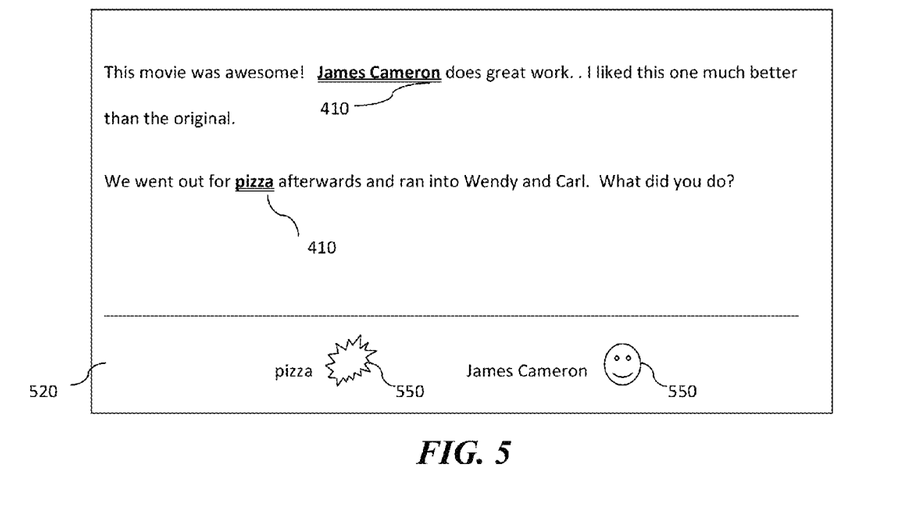
FIG. 5 is an example of a widget configured to operate according to an embodiment of the present invention.

Finally in step 280 we provide tooling to let users interact with these objects, store, or share them, compile object/topic pages on the fly (e.g., based on the meta-data obtained. FIG. 4 shows one particular embodiment leveraging existing user interfaces. In this example we use Yahoo! Contextual Shortcuts. The Yahoo! Shortcuts is a plug-in provided to enrich blog posts with content from other sources (maps, finance quotes, headlines, and the like). Entities are highlighted with double underline 410. When the user moves his/her pointer 420 to hover/click on the underlined item, an overlay/pop-up 450 is displayed with related content. FIG. 5 shows another embodiment wherein a widget is embedded in the footer 520 of the email that shows the objects along with a visual thumbnail 550 (e.g., a photo or map) representing them.

Figure 6:
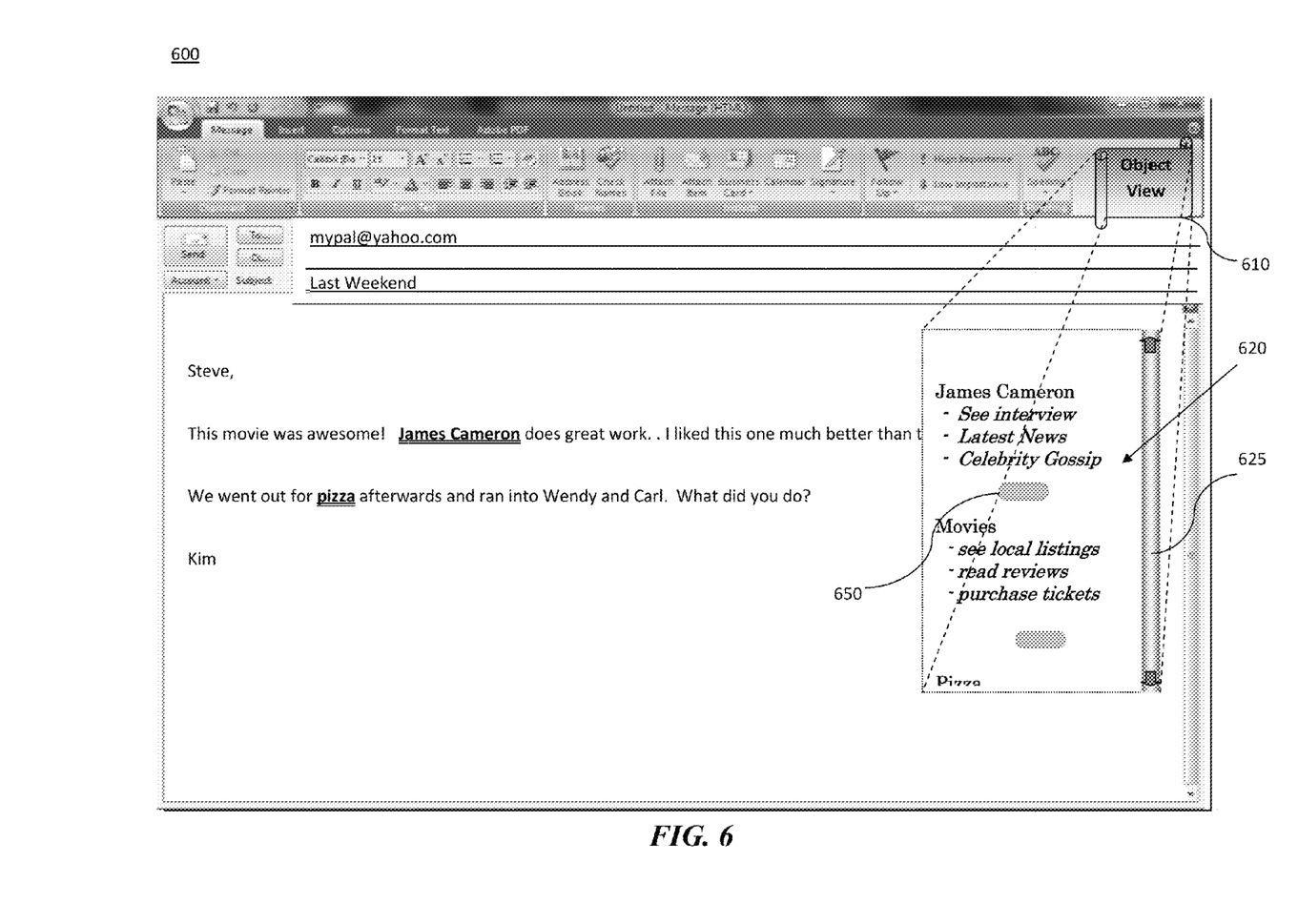
FIG. 6 is an example of an object view according to an embodiment of the present invention.

FIG. 6 shows an example of an object view provided with an email 600, according to one embodiment of the present invention. Here in this example we provide an optional "Object View" button 610 on the toolbar letting the user know that this feature is available. Note that in one embodiment the user must select the "Object View" button 610 in order to activate the feature. In another embodiment the "Object View" button 610 does not need to activated by the user. In order not to take up too much real estate on the email screen and to accommodate mobile devices, the object view area 620 can use a slider bar 625.

The object view area 620 shown here is the output from the process of FIG. 2. Here we present the user with a ranked list of objects of interest. The objects shown here are "James Cameron," "movies," and "pizza." Note that the "movies" object was not explicitly supplied in the user's email; but instead it was derived from a collection of the user's emails that day. It should be noted that this is just a simplified example of an object view. We could also incorporate the thumbnail pictures and the overlay of FIGS. 4 and 5 within the object view area. The user is able to scroll through this listing of objects of interest and select any or all of them to "share" with social contacts by selecting the "share" button 650. This will provide the same information to correspondents within the user's social network using known means of "sharing."

Figure 3:
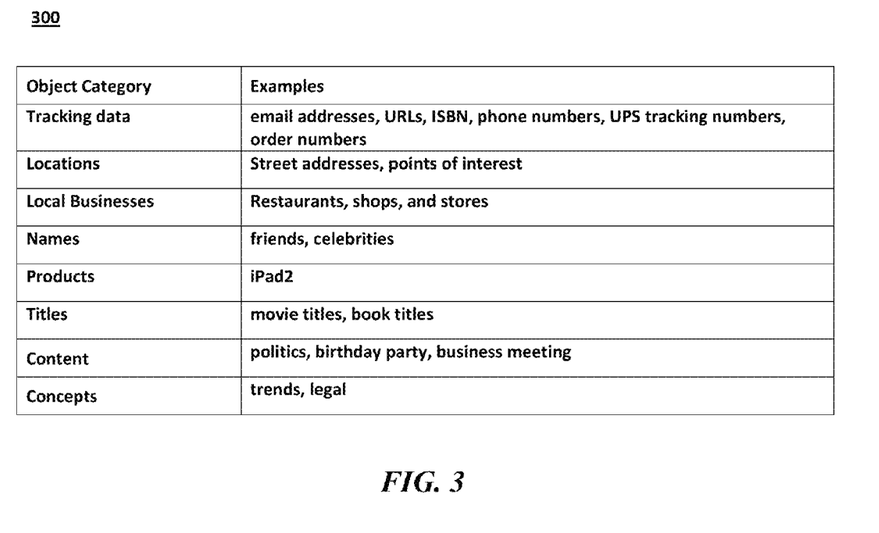
FIG. 3 is a table summary of objects, according to an embodiment of the present invention.

FIG. 3 is a table 300 showing a summary of objects that can be detected in emails. This list is by no means comprehensive, but should be used as a guide to the possible objects that may be derived from emails. Relevant objects can be very difficult to identify because they are often buried in email text. Also, the temporal history of the object has to be taken into consideration. Older objects (for example, older than a day or two) may no longer be relevant. For example, consider a chain of emails regarding a business meeting or other planned event. Once the event is over, the objects related to the event may no longer be of interest to the email user.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for enriching emails, said method comprising: using a processor device configured to perform:
   receiving a user's incoming email messages, each message comprising a header, message body, and signature;
   filtering out a salutation and signature of the user's incoming email messages;
   performing semantic analysis and object detection on each incoming email message body to derive a plurality of current objects of interest;
   applying a search service to the current objects of interest to retrieve relevant search-based content;
   associating the relevant search-based content with the current objects of interest;
   ranking the current objects of interest according to various criteria;
   providing a user interface on the header of the user's incoming email messages; and
   displaying the ranked current objects of interest along with the search-based content in an object view on the user interface.

2. The method of claim 1 wherein associating the relevant search-based content further comprises associating relevant web-based applications with the objects of interest.

3. The method of claim 1 wherein ranking the current objects of interest comprises sorting said current objects of interest based on at least one parameter selected from a group consisting of: time, type of object, history of interaction, buzzyness, and overall popularity.

4. The method of claim 1 further comprising recording metadata associated with each current object of interest.

5. The method of claim 1 wherein displaying the ranked current objects comprises displaying only higher-ranked current objects with their associated search-based content.

6. The method of claim 1 further comprising providing tooling on the user interface to enable user manipulation of the search-based content.

7. The method of claim 6 further comprising providing an overlay with the search-based content wherein said overlay is displayed in association with its ranked object.

8. The method of claim 6 further comprising providing a digital image associated with the ranked object, wherein the search-based content is displayed upon selection of the digital image.

9. The method of claim 6 further comprising refreshing the list object view on a timed schedule.

10. The method of claim 6 further providing a share button in association with the ranked object, said share button allowing the user to share the search-based content associated with the ranked object with correspondents within a social network to which the user belongs.

11. An information processing system for enriching emails, comprising:
    a memory with computer-executable program instructions for causing a computer to perform:
    receiving a user's incoming email messages, each message comprising a header, message body, and signature;
    filtering out a salutation and signature of the user's incoming email messages;
    performing semantic analysis and object detection on each incoming email message body to derive a plurality of current objects of interest;
    applying a search service to the current objects of interest to retrieve relevant search-based content;
    associating the relevant search-based content with the current objects of interest;
    ranking the current objects of interest according to various criteria;
    providing a user interface on the header of the user's incoming email messages; and
    displaying the ranked current objects of interest along with the search-based content in an object view on the user interface; and
    a processor device operably coupled with the memory for executing the program instructions.

12. The information processing system of claim 11 further comprising: providing tooling on the user interface to enable user manipulation of the search-based content.

13. The information processing system of claim 12 wherein ranking the current objects of interest comprises sorting said current objects of interest based on at least one parameter selected from a group consisting of: time, type of object, history of interaction, buzzyness, and overall popularity.

14. The information processing system of claim 11 further comprising recording metadata associated with each current object of interest.

15. The information processing system of claim 12 further comprising providing an overlay with the search-based content wherein said overlay is displayed in association with its ranked object.

16. The information processing system of claim 12 further comprising providing a digital image associated with the ranked object, wherein the search-based content is displayed upon selection of said digital image.

17. The information processing system of claim 12 further comprising providing a share button in association with the ranked object, said share button allowing the user to share the search-based content associated with the ranked object with correspondents within a social network to which the user belongs.

18. The information processing system of claim 12 further comprising refreshing the object view on a timed schedule.

19. A computer program product comprising a non-transitory computer-readable storage medium comprising computer-executable instructions that when executed by a computer, cause the computer to perform:
    receiving a user's incoming email messages, each message comprising a header, message body, and signature;
    filtering out a salutation and signature of the user's incoming email messages;
    performing semantic analysis and object detection on each incoming email message body to derive a plurality of current objects of interest;
    applying a search service to the current objects of interest to retrieve relevant search-based content;
    associating the relevant search-based content with the current objects of interest;
    ranking the current objects of interest according to various criteria;
    providing a user interface on the header of the user's incoming email messages; and
    displaying the ranked current objects of interest along with the search-based content in an object view on the user interface.

20. The computer program product of claim 19 further comprising: providing tooling on the user interface to enable user manipulation of the search-based content.

\* \* \* \* \*